US008069094B2

(12) United States Patent
Johnson et al.

(10) Patent No.: US 8,069,094 B2
(45) Date of Patent: Nov. 29, 2011

(54) COMPUTER GENERATED BROADCAST VIDEO STREAM FOR MULTIPLE PRODUCT SALE DISPLAY

(75) Inventors: Eric L. Johnson, Knoxville, TN (US); Paul Izbicki, Knoxville, TN (US); Chris Dotson, Dandridge, TN (US)

(73) Assignee: America's Collectibles Network, Knoxville, TN (US)

( * ) Notice: Subject to any disclaimer, the term of this patent is extended or adjusted under 35 U.S.C. 154(b) by 1673 days.

(21) Appl. No.: 11/274,026

(22) Filed: Nov. 15, 2005

(65) Prior Publication Data

US 2007/0120840 A1     May 31, 2007

(51) Int. Cl.
    *G06Q 30/00*     (2006.01)
(52) U.S. Cl. .................. 705/27.1; 705/26.1; 705/14.24
(58) Field of Classification Search ................. 705/26, 705/27, 14
See application file for complete search history.

(56) References Cited

U.S. PATENT DOCUMENTS

| 6,378,129 | B1* | 4/2002 | Zetts ............................. 725/94 |
| 2003/0070167 | A1* | 4/2003 | Holtz et al. .................... 725/32 |
| 2005/0096998 | A1* | 5/2005 | Gieselmann et al. ......... 705/26 |
| 2007/0028172 | A1* | 2/2007 | Greer et al. .................. 715/705 |

OTHER PUBLICATIONS

Chain Store Age: "Want to buy it? Call Tootie; HSC's VRU keeps phones ringing," Chain Store Age, May 1988, v64n5p222(2); Dialog file 148 #03524232, 4pgs.*

* cited by examiner

*Primary Examiner* — Robert M. Pond
(74) *Attorney, Agent, or Firm* — Pitts, Lake & Bell, PC

(57) ABSTRACT

An apparatus for a virtual turntable system for computer generated broadcast video streams for a multiple product sales display. The virtual turntable system collects data, including images and status information, and generates a video stream for presenting product information sequentially on a video monitor. In one embodiment, the virtual turntable system reads the data, including the turntable list, formats and updates the data, and then outputs the data in a video stream. In one embodiment, the virtual turntable system includes a data storage device for storing the data for the virtual turntable system, a computer system for accessing the data and creating item containers for the items on the current item list that are to be displayed on a monitor, and a video imager for creating a video stream for displaying a plurality of current items in a rotating or other sequential manner.

38 Claims, 5 Drawing Sheets

COMPUTER GENERATED BROADCAST VIDEO STREAM FOR MULTIPLE PRODUCT SALE DISPLAY

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to a virtual turntable system for computer generated broadcast video streams for multiple product sales display. More particularly, this invention pertains to a replacement for the prior art system of placing multiple products on a rotating turntable in front of a video camera. The new system collects the data, including images and status information, and generates a video stream for presenting product information sequentially.

2. Description of the Related Art

In broadcast video, one method retailers use to sell multiple items is to place the items 106 on a rotating turntable 102 with a video camera 108 positioned to record images of each item 106 as it rotates past the camera 108. See FIGS. 1A and 1B. In practice, items 106 are placed on a circular tray attached to a motor. A number identifies each item 106 on the turntable 102. A viewer watches the broadcast video on a video screen 112 and can purchase one of the items 106 by calling a number displayed on the screen 112. The number is answered by a call center operator who can provide a price and a description of the item 106 based on the number displayed with the item 106.

The rotating turntable 102 allows viewers to see the current item 106-A for sale and to also see the previous item 106-H, thereby allowing the viewer time to call the call center operator. The turntable 102 also allows the items 106 to be repeatedly shown on the screen 112 with the items shown sequentially.

To create a turntable 102, at least one of each item 106 must be retrieved from stock, arranged on the turntable, and have its information entered into a computer that is accessed by the call center operator. As each item 106 is sold out, the item 106 must be returned to stock, a replacement item 106 must be retrieved from stock, arranged on the turntable 102, and have its information entered into the computer. Any changes or updates requires that the items 106 be replaced or rearranged manually.

BRIEF SUMMARY OF THE INVENTION

According to one embodiment of the present invention, a virtual turntable system is provided. The virtual turntable system displays images and other information in a format that simulates a manual turntable rotating in front of a video camera. In one embodiment, the virtual turntable system produces a display of two or more items from a preselected list. Each item is displayed with an item identifier, an availability indicator, an image of the item, and a short description of the item. The items are sequentially displayed on a screen with each item displayed for a selected period before being replaced with another item.

In one embodiment, a computer system stores data including images and description information. The virtual turntable system reads the data, including the turntable list, formats and updates the data for presentation, and then outputs a video stream showing at least two items from the list with the items changing at a selected interval. Formatting the data includes creating an item container with an item identifier, an item graphic, and an item description. In one embodiment, color coded information is included in the item container to indicate the availability of the item for sale.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

An apparatus for a virtual turntable system 100 for computer generated broadcast video streams for multiple product sales display is disclosed. The virtual turntable system 100 allows for presenting information on multiple items sequentially. The virtual turntable system 100 collects the data, including images and status information, and generates a video stream for presenting the product information sequentially.

Figure 1A:
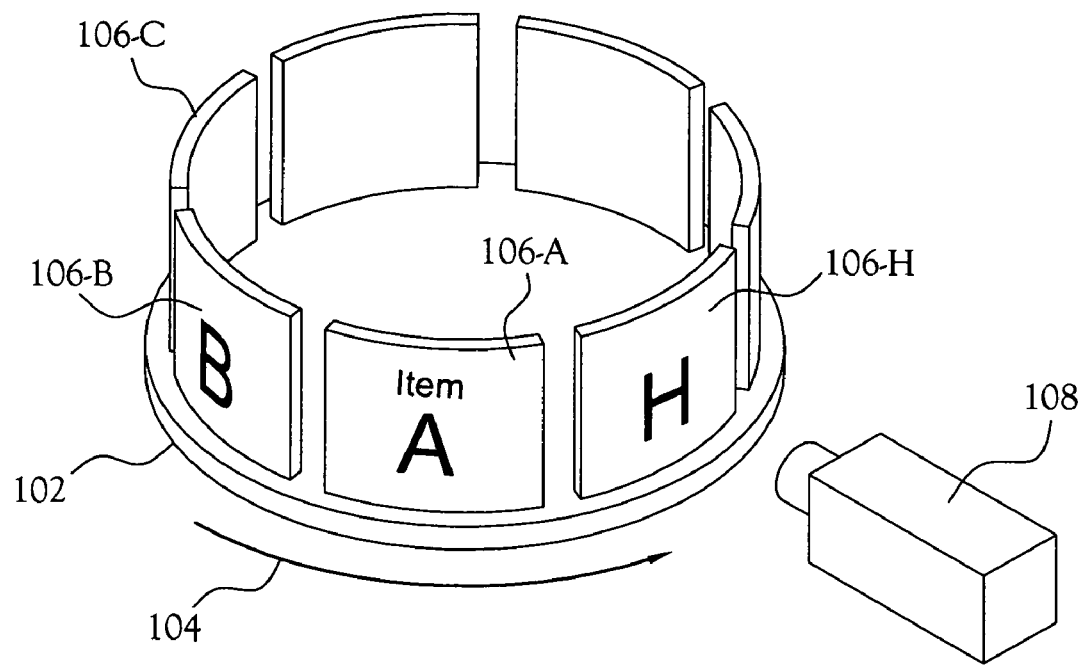
FIG. 1A is a symbolic view of a prior art video turntable system.
Figure 1B:
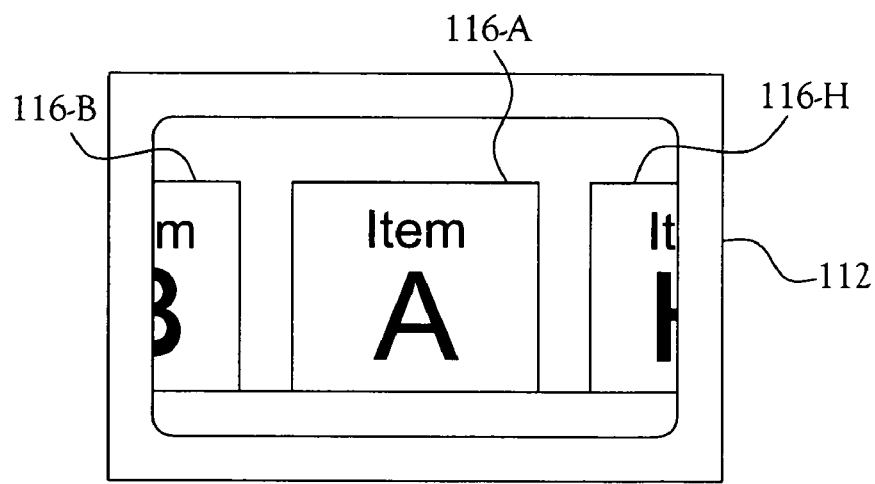
FIG. 1B is a view of the prior art video turntable system as it appears on a video monitor.

FIG. 1A illustrates a symbolic view of a prior art video turntable system. FIG. 1B illustrates a view of the prior art video turntable system as it appears on a video monitor 112. In the prior art system, a turntable 102 is rotated at a selected speed and direction 104. A plurality of items, or products, 106-A, 106-B, 106-C, . . . , 106-H (collectively, items 106) are positioned at regular intervals on the turntable 102. The items 106 pass in front of a video camera 108 that captures images of the items 106. The image captured by the camera 108 is presented on a television, or video, monitor 112. The items 106 are seen to move across the face of the monitor 112 at the same speed and direction as the items 106 pass in front of the camera 108.

In this prior art system, the items 106 have to be physically pulled from inventory and positioned on the turntable 102. When an item 106 is sold out, it must be physically removed from the turntable 102. The physical adding and removing from the turntable 102 must be done manually and quickly to avoid calls for items 106 that are no longer available and allow available items 106 to be seen by potential buyers.

Figure 2A:
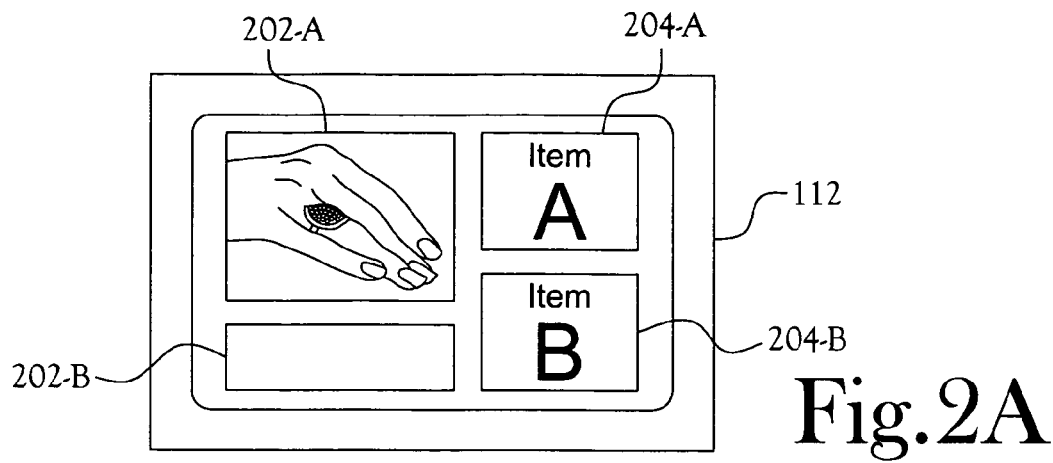
FIG. 2A is a view of one embodiment of the virtual turntable system as it would appear on a video monitor.

FIG. 2A illustrates a view of one embodiment of the virtual turntable system 100 as it appears on a television, or video, monitor 112. Two turntable items 106 are displayed vertically on the monitor 112, each in one of two containers 204-A, 204-B. As used herein, item 106 generally refers to both the physical manifestation and the digital manifestation of a product or other item for sale.

In one embodiment, the items 106 rotate virtually. That is, after a certain elapsed time, such as fifteen to thirty seconds, the turntable item 106-A displayed in the upper turntable container 204-A is replaced with the turntable item 106-B displayed in the lower turntable container 204-B and the lower turntable container displays the next item 106-C on the turntable list 602. The items 106 rotate each time interval so that every item 106 in the current list 604 of the turntable list 602 is displayed sequentially and repeatedly. The illustrated embodiment includes the current item 106-B and one previous item 106-A for an eight-item list 604 where the items 106 rotate singly. That is, the items in the turntable list 602 are sequentially displayed by replacing one of the turntable containers 204 with information on another item 106. In another embodiment, the two turntable items 106-A, 106-B displayed in the containers 204-A, 204-B are both replaced at one time with two new turntable items 106-C, 106-D. In this embodiment, both of the turntable containers 204 have their displayed content changed each time interval.

To the left of the containers 204 displaying the turntable items 106-A, 106-B are two graphic containers 202-A, 202-B. In the illustrated embodiment, the upper graphic container 202-A displays a graphic, such as a video displaying one of the turntable items 106 displayed in the turntable containers 204 or another associated item 106. Graphic, as used herein, is broadly interpreted to mean any representation capable of display on a video monitor 112. The lower graphic container 202-B displays information for the viewer, such as the broadcaster's logo and contact information or telephone number. The illustrated embodiment shows that the virtual turntable system 100 is easily integrated with convention video presentations. For example, as a video presentation is made of one item 106, along with other information presented to the viewer, the virtual turntable system 100 presents the turntable items 106 to the viewer through the turntable containers 204.

Figure 2B:
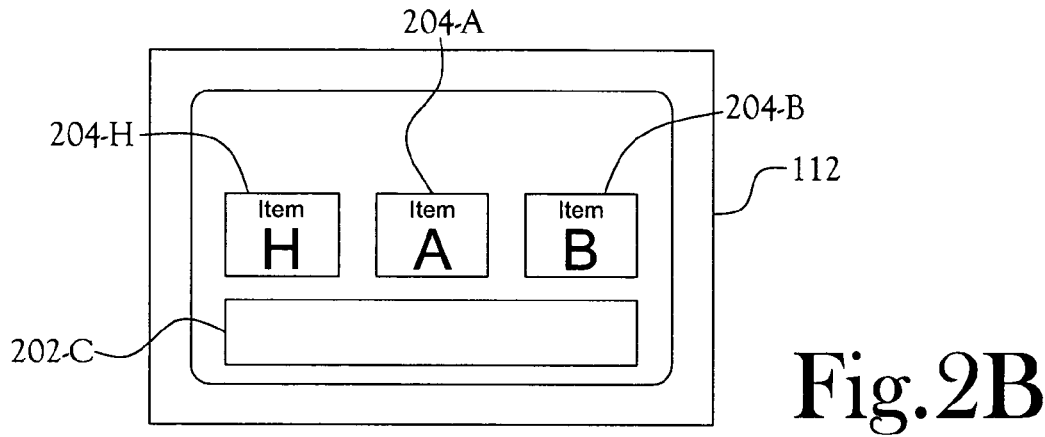
FIG. 2B is a view of another embodiment of the virtual turntable system as it would appear on a video monitor.

FIG. 2B illustrates a view of another embodiment of the virtual turntable system 100 as it appears on a television, or video, monitor 112. Three turntable containers 204-H, 204-A, 204-B are illustrated horizontally on the video monitor 112, along with a graphic container 202-C for displaying other information on the monitor 112. In one embodiment, the turntable items 106 are rotated singly, that is, after a certain time, the oldest displayed item 106-H in a turntable container 204-H is replaced with the second oldest displayed item 106-A, the least old item 106-B replaces the second oldest item 106-A, and a new item 106-C replaces the least old item 106-B. In one embodiment, the contents of the containers 204 is replaced. In another embodiment, the containers 204 scroll, or move, across the screen to a new position, with the oldest displayed item 106-H scrolling off the monitor 112. In various embodiments, the transition of one item 106 with a new item 106 in the containers 204 may include display features such as fade in/fade out, checkerboards, wipes, blinds, and/or other modes of replacing and/or moving displayed containers/elements on a video monitor 112.

In another embodiment, all the displayed turntable containers 204-H, 204-A, 204-B are replaced, or scrolled, in favor of three other items 106. That is, after a certain time, all the turntable items 106 displayed in the turntable containers 204 are removed from display with three new turntable items 106 displayed in the turntable containers 204.

In still another embodiment, more than one, but less than all items 106 displayed in the containers 204 are removed from display with a corresponding number of new turntable items 106 displayed in the turntable containers 204. In this embodiment, the remaining turntable items 106 are re-positioned with the new turntable items 106 assuming the previous position of the remaining turntable items 106 in the various turntable containers 204. In this manner, the items 106 have the appearance of rotating on a virtual turntable as the items 106 seem to move across the display area of the video monitor 112.

In the illustrated embodiment, the three turntable containers 204-H, 204-A, 204-B do not fill the display area of the video monitor 112. An information container 202-C is shown below the containers 204. The information container 202-C contains, in various embodiments, additional information relating to the broadcast, contact information including a telephone number and/or a web site, graphics relating to one or more of the turntable items 106, or any other type of information that is useful to the viewer or desired to be displayed along with the virtual turntable system 100. In other embodiments, the turntable containers 204 are positioned toward either the top or the bottom of the display area of the video monitor 112 and the information container 202-C is sized to use the remaining space. In still another embodiment, the turntable containers 204 are centered in the display area of the video monitor 112 and a pair of information containers 202 are positioned on either side of the turntable containers 204.

Figure 3:
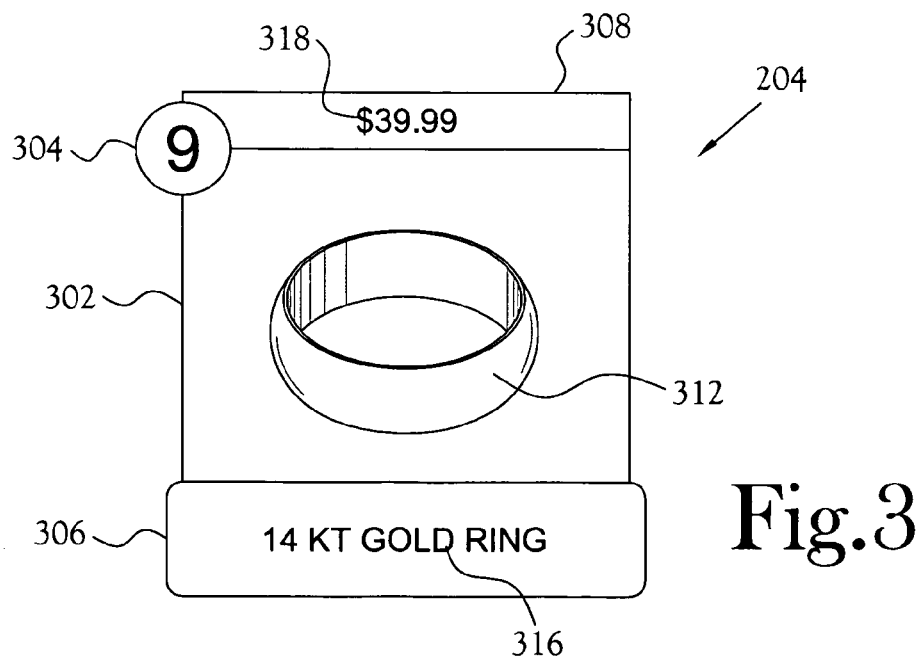
FIG. 3 is a pictorial view of one embodiment of a container displaying information for a sample item on the virtual turntable.

FIG. 3 illustrates a pictorial view of one embodiment of a container 204 displaying information on a sample item 106 from the virtual turntable system 100. In the illustrated embodiment, the container 204 includes four separate elements: an identification element 304, an item display element 302, a description element 306, and a price element 308. Those skilled in the art will recognize that the location, size, and position of the elements 304, 302, 306, 308 can vary from that illustrated without departing from the spirit and scope of the present invention. In other embodiments, one or more of the elements 304, 302, 306, 308 are combined with one or more of the other elements 304, 302, 306, 308.

In the illustrated embodiment, the identification element 304 is a round button that includes a foreground and a background. In other embodiments, the identification element 304 has other shapes and/or configurations, for example, a square or polygonal shaped button. In still other embodiments, the identification element 304 is a graphic element identifying the item 106. In the illustrated embodiment, the foreground includes an item identifier, which in FIG. 3 is depicted as the number "9." The item identifier, in various embodiments, is a number, a letter, or a combination of numbers and letters, that uniquely identifies the item 106 in the virtual turntable system 100. In one embodiment, the identification element 304 is color coded to indicate the availability of the item. For example, a green color indicates that the item 106 is still available, a yellow color indicates that at least one half of the inventory for the item 106 has been sold, and a red color indicates that the item 106 is almost sold out. In one embodiment, the background of the identification element 304 displays the color code. In another embodiment, the item identifier, or foreground of the identification element 304, displays the color code and the color of the background of the identification element 304 is unchanging.

In the illustrated embodiment, the item display element 302 is a rectangular area containing a graphic 312 of the item

106. The graphic 312, in the illustrated embodiment, is a picture or graphical representation of the item 106. Graphic, as used herein, is broadly interpreted to mean any representation capable of display on a video monitor 112. Accordingly, in various embodiments, a graphic 312 is a still picture, drawing, illustration, collage, or other representation of an item 106. In other embodiments, a graphic 312 is a video picture, drawing, illustration, or other animated representation of an item 106.

In the illustrated embodiment, the description element 306 is a rectangular area that includes a foreground and a background. In other embodiments, the description element 306 has other shapes and/or configurations, for example, a square or rounded shape. The foreground of the description element 306 includes an item description 312, which in FIG. 3 is depicted as the text "14 KT GOLD RING." The text 316 is a short description or other information relating to and/or describing the item 106 presented in a format that is readable on a monitor 112.

In the illustrated embodiment, the price element 308 is a rectangular area that includes a foreground and a background. In other embodiments, the price element 308 has other shapes and/or configurations, for example, a square or rounded shape, or the price element 308 is combined with one of the other elements, such as the item display element 302 or the description element 306. The foreground of the illustrated price element 308 includes a price 318, which in FIG. 3 is depicted as the text "$39.99." The price 318 is a numerical value or other indication of the price of an item 106, for example, the amount of periodic payments.

In various embodiments, the color of the foreground and/or the color of the background of the identification element 304, the item display element 302, the description element 306, and/or the price element 308 is color coded to indicate the availability of the item. In various embodiments, the foreground and/or the background of the identification element 304, the item display element 302, the description element 306, and/or the price element 308 flashes, blinks, or otherwise deviates from a normal condition to indicate a specific status of the item 106 or to draw the viewer's attention to some piece of information.

In one embodiment, the identification element 304, the item display element 302, the description element 306, and/or the price element 308 are surrounded by a border as illustrated in FIG. 3. In other embodiments, the identification element 304, the item display element 302, the description element 306, and/or the price element 308 are surrounded by a stylized border that includes rounded corners, shading, or other graphic attributes that increase the esthetic appearance of the elements 302, 304, 306. In still other embodiments, the identification element 304, the item display element 302, the description element 306, and/or the price element 308 do not have a visible border that is displayed on the monitor 112.

Figure 4:
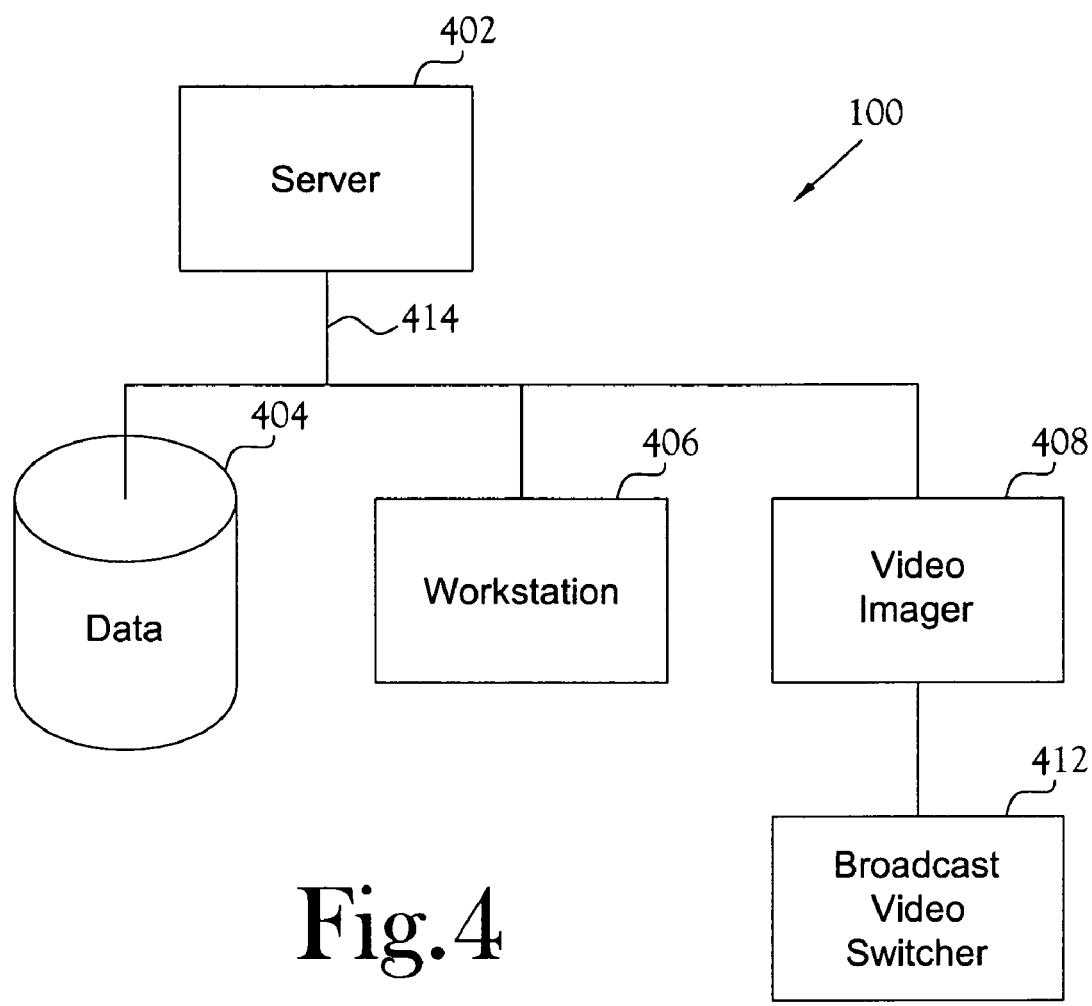
FIG. 4 is a block diagram of one embodiment of the virtual turntable system.

FIG. 4 illustrates a block diagram of one embodiment of the virtual turntable system 100. In the illustrated embodiment, a server 402 accesses a data storage unit 404 containing images of the various items 106 and information on the various items 106. The server 402 communicates via a network 414 with at least two clients: a workstation 406 for accessing the data in the data unit 404 and building the virtual turntable list, and a video imager 408 for constructing the broadcast videos for the virtual turntable system 100. The video imager 408 is connected to a broadcast video switcher 412. FIG. 4 illustrates the functional aspects of the virtual turntable system 100 as individual components. In other embodiments, the one or more of the functions are combined with other functions, for example, the server 402, data unit 404, and workstation 406 are combined into one computer system. As another example, the functions performed by the workstation 406 and the video imager 408 are combined into a single computer that is a client of the server 402.

The term "server" should also be broadly construed to mean a computer, computer platform, an adjunct to a computer or platform, or any component thereof that provides data or information to a client. The server 402 runs, or executes, software that allows it to properly handle and process client requests, in addition to other processes necessary for the server 402 to perform its required functions. Of course, a client should be broadly construed to mean the equipment that requests or gets a file or information, and a server is the equipment that provides the file or information. These terms are based on the function of the associated equipment and the terms may interchange as the function of a particular piece of equipment changes. For example, in one embodiment the functions of the server 402, the data storage 404, the workstation 406, the video imager 408, and the broadcast video switcher 412 are performed by a single computer system. In other embodiments, these functions are performed by various equipment configurations.

Further, as used herein, a "client" should be broadly construed to mean any computer or component thereof directly or indirectly connected or connectable in any known or later-developed manner to a computer network, such as the Internet or a local area network. Examples of a client include, but are not limited to, a personal computer, a terminal that communicates over the Internet, and an Internet connected television. The client 406, 408 runs, or executes, software that communicates with the server 402.

Shown in FIG. 4 is a data storage device 404, which includes a database containing tables storing the data related to the virtual turntable system 100. The data storage device 404 is in communication with the server 402, and the data storage device 404 can be any of various devices known in the art for storing data, such as, but not limited to, a hard disk, a network attached storage device (NAS), recordable optical disks, and/or a stand-alone networked data storage device. Although FIG. 4 illustrates the data storage device 404 connected to the network 414 and communicate with the server 402 via the network 414, in another embodiment, the data storage device 404 communicates directly with the server 402 independent of the network. In still another embodiment, the data storage device 404 is integrated into a computer system, for example one or more of the server 402, the workstation 406, and the video imager 408.

The video imager 408 executes software for creating a video stream of the virtual turntable system 100. The video stream includes a representation of at least two containers 204, with that representation being replaced by a second representation after a selected time period. The second representation is of all but one of the containers 204 of the first representation plus a new container 204. Accordingly, the video stream includes the information for the items 116 that are to be displayed on a monitor 112 simultaneously for the time period in which the information is to be displayed. As time progresses, the video stream changes to reflect the items 116 that are to be displayed on a monitor 112 simultaneously at that time. The representations of the sets of items 116 to be displayed at one time on a monitor 112 have the items 116 of each representation shifting by one position, with the newly added item 116 in the second representation replacing the newest item 116 in the first representation.

Figure 5:
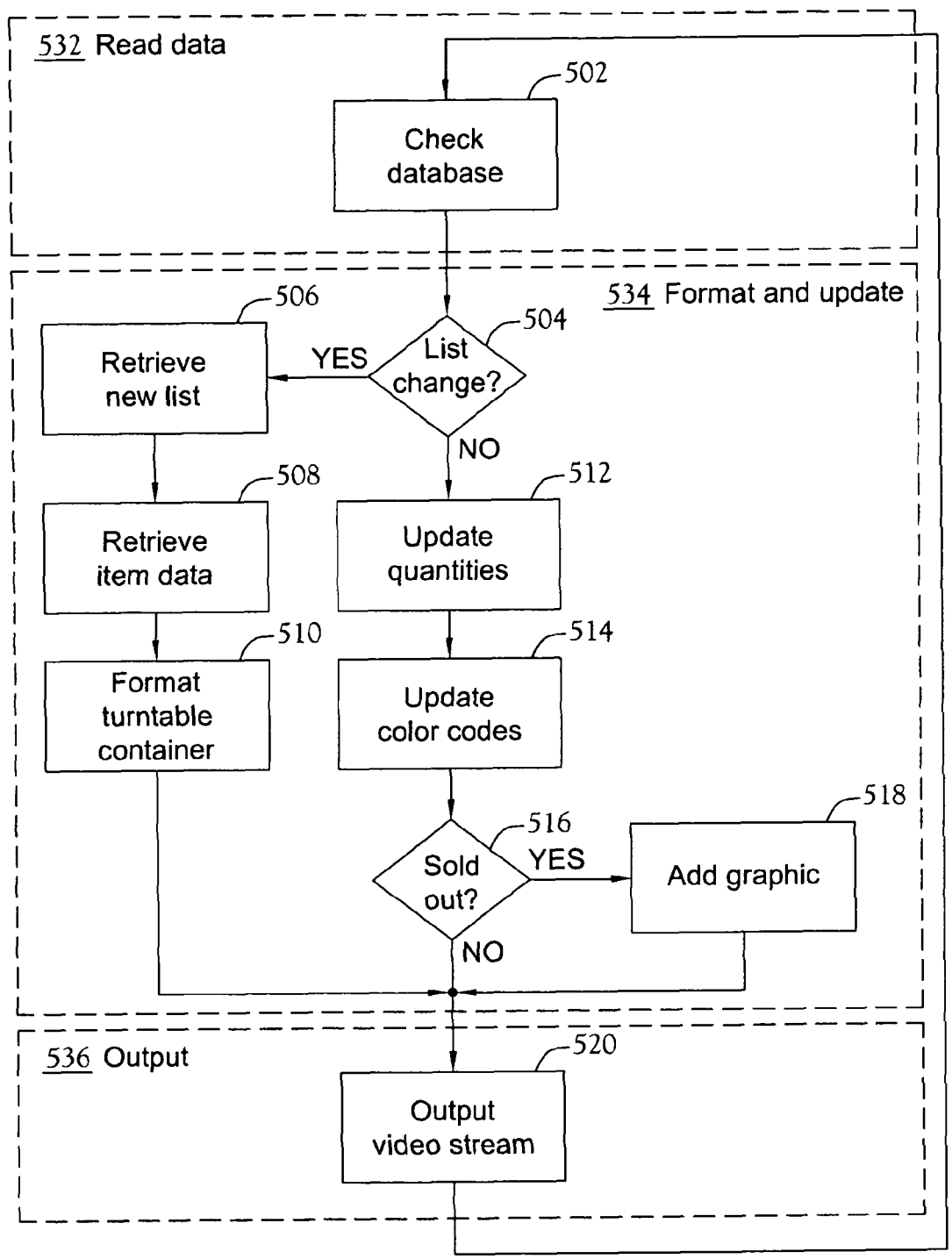
FIG. 5 is a flow diagram of one embodiment of the virtual turntable system.

FIG. 5 illustrates a flow diagram of one embodiment of the virtual turntable system 100. The illustrated block diagram assumes that the turntable list 602 of items 106 for the virtual turntable system 100 has been created. In one embodiment, the functions illustrated in FIG. 5 are performed on the video imager 408. The first step is to check the database 502 to retrieve the data associated with the items 106 on the list from the data storage device 404. In various embodiments, the data includes the item identifier, one or more graphic images of the item 106, the item description, the item price, and the number of items 106 remaining in stock.

After checking the database 502, the next step is to determine if the current list 604 has changed 504. If the current list 604 has not changed, the next step is to update the quantities 512. Along with updating the quantities 512, the displayed color codes are updated 514. If the quantity available for an item 106 indicates that the item 106 is sold out 516, then a graphic is added 518. In one embodiment, the graphic is a "SOLD OUT" indicator that appears in the turntable container 204. In the steps 512, 514, 516, 518 following the step of no list change 504, the information to be displayed on the monitor 112 is determined.

If the item is not sold out 516 or if a graphic is added 518, the next step is to output the video stream 520, with the video stream being the stream to be displayed on the monitor 112. The step of output video stream 520 is implemented, in one embodiment, by the video imager 408 communicating with the broadcast video switcher 412 to produce the video viewed on the monitor 112. In another embodiment, the video stream produced by the step of output video stream 520 is combined with other video elements 202 to produce the video viewed on the monitor 112. After the step of output the video stream 520, the loop repeats by checking the database 502 again.

After the step of checking the database 502, the next step is to determine if the turntable list 602 has changed 504. If the current list 604 has changed, then the step of retrieving 506 the new current list 604 is performed. In one embodiment, the current list 604 is changed when an item 106 on the list 604 is sold out or no longer available, as indicated in the database that was checked in step 502. In another embodiment, the current list 604 is changed when a producer or other person determines that an item 106 is to be replaced on the current list 604. In this embodiment, the database includes a flag or other indicator that a specific item 106 is to be removed from the current list 604. The step of retrieving the new list 506 includes the identification of the items 106 on the current list 604 as described below with respect to FIG. 6.

The step of retrieving item data 508, in one embodiment, includes retrieving data for the new item 106 that replaces a removed item 106. In another embodiment, the step of retrieving data 508 includes retrieving the data for all the items 106 on the current list 604. In various embodiments, the retrieved data includes one or more of the item description, price information, quantity available, and graphic elements necessary to build and format a turntable container 204 for a specific item 106.

The next step after retrieving data 508 is to format the turntable container 510, which includes combining the appropriate elements 302, 304, 306, 308 to build and format a turntable container 204. In one embodiment, the formatting 510 is accomplished by fitting the elements 302, 304, 306, 308 in accordance with a pre-configured template. After being formatted 510, the next step is to output the video stream 520.

After the step of outputting the video stream 520, the steps are repeated, beginning again with checking the database 502. In one embodiment, the steps identified in FIG. 5 are repeated for each item 106 on the current list 604, after which the steps are repeated beginning with the first item 106 in the current list 604. In another embodiment, each of the steps identified in FIG. 5 are performed for all the items 106 on the current list 604 before proceeding to the next step, and then the steps are repeated as a loop.

The steps identified in FIG. 5 are performed repeatedly as steps in a loop. Because the virtual turntable system 100 provides real-time information for viewers at a monitor 112, the loop of steps is repeated with a frequency that provides meaningful information to the viewers. That is, the frequency of repetition is based upon the rate of change of the availability information, e.g., quantity available, which is based on the rate at which the item 106 is being sold. In this embodiment, the turntable containers 204 being displayed on the monitor 112 are updated in real-time or with a short delay. In another embodiment, the loop of steps is executed once for each item 106 to be displayed just before a container 204 is to be rotated off the display on the monitor 112. In this way, the information and containers 204 are formatted 510 and updated 512, 514, 516, 518 before being displayed, and the containers 204 are not updated for the short time that the containers 204 are displayed on the monitor 112.

While the methods and processes disclosed herein have been described and shown with reference to particular steps performed in a particular order, it will be understood that these steps may be combined, sub-divided, or re-ordered to form an equivalent method without departing from the teachings of the present invention. Accordingly, unless specifically indicated herein, the order and grouping of the steps is not a limitation of the present invention.

FIG. 5 illustrates the processing of the virtual turntable system 100 as including three main routines or processes: read the data 532, format and update 534 the data for the virtual turntable display, and output the video 536. Reading the data 532 includes retrieving the turntable list 602 and is performed by the check database 502 step. In the illustrated embodiment, the database 404 includes the data relevant to the turntable list 602 and the items 106 for the virtual turntable system 100.

Formatting and updating 534 the data is performed by checking to see if the list has changed 504, updating the quantities 512 and color codes 514, determining if sold out 516 and adding a graphic 518 if needed, building a new turntable list 506, adding data 508, and formatting the data 510. The updating and formatting routine 534 includes the enumerated steps or subroutines, which, in various embodiments, are performed as illustrated in FIG. 5 or in another order to accomplish the same result. In the illustrated embodiment, the formatting and updating routine 534 includes converting the data read from the database 404 into a form suitable for viewing on a monitor 112.

Outputting 536 the video is performed by the step of outputting the video stream 520. In the illustrated embodiment, the output routine 536 converts the data representing the turntable containers 204 into a video stream viewable on a monitor 112. In one embodiment, the video stream includes one or more turntable containers 204. In other embodiments, the video stream includes one or more information containers 202 presented along with the turntable containers 204.

In one embodiment, each of the functions identified in FIG. 5 and discussed herein are performed by one or more software routines executed by one or more of the server 402, the workstation 406, the video imager 408 and/or the video switcher 412. In another embodiment, one or more of the functions identified are performed by hardware and the remainder of the functions are performed by one or more software routines run by one or more of the server 402, the workstation 406, the video imager 408 and/or the video switcher 412. In still another embodiment, the functions are implemented with hardware, with the hardware 402, 406, 408, 412 providing routing and control of the virtual turntable system 100.

The video imager 408, along with the server 402 and the workstation 406, executes software, or routines, for performing various functions. These routines can be discrete units of code or interrelated among themselves. Those skilled in the art will recognize that the various functions can be implemented as individual routines, or code snippets, or in various groupings without departing from the spirit and scope of the present invention. As used herein, software and routines are synonymous. However, in general, a routine refers to code that performs a specified function, whereas software is a more general term that may include more than one routine or perform more than one function. Those skilled in the art will recognize that it is possible to program a general-purpose computer or a specialized device to implement the invention.

Figure 6:
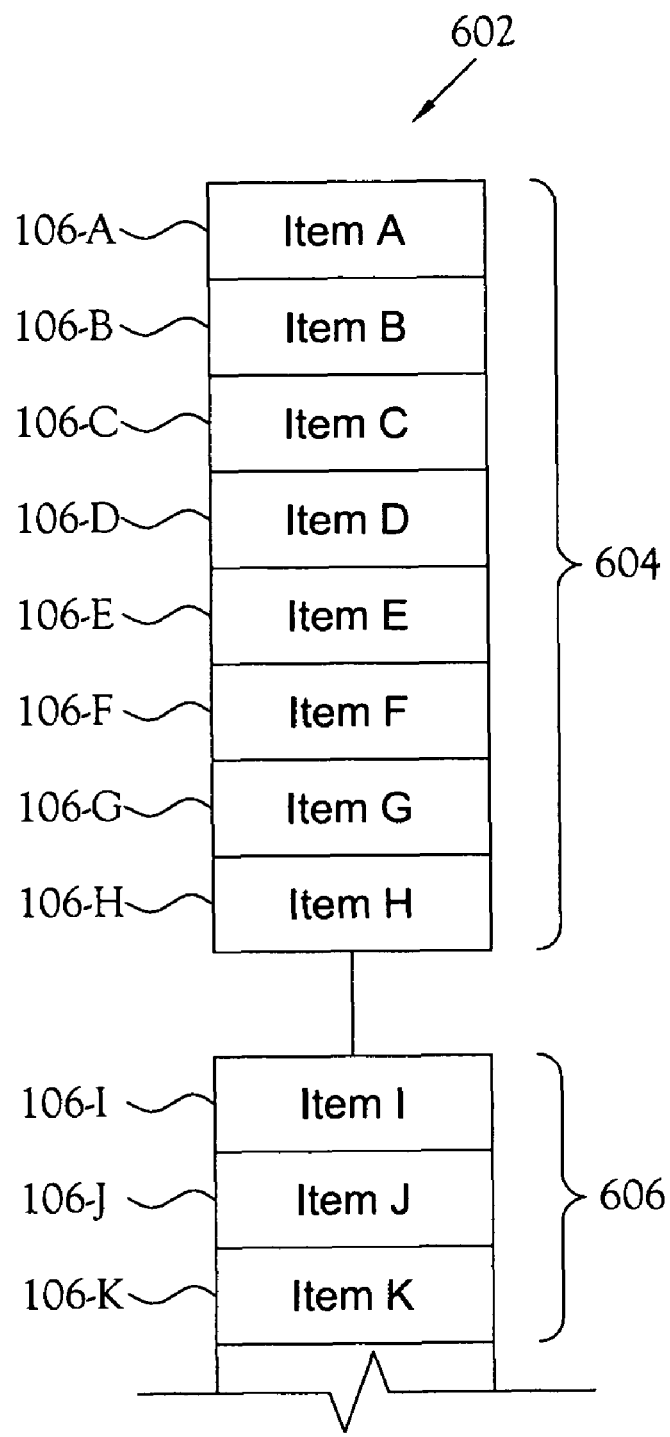
FIG. 6 is a pictorial view of one embodiment of a turntable list.

FIG. 6 illustrates a pictorial view of one embodiment of the data structure of a turntable list 602. The illustrated embodiment of the data structure of the turntable list 602 includes two parts: a current list 604 of items 106-A to 106-H to be displayed currently by the virtual turntable system 100 and a queued list 606 of items 106-I to 106-K queued to be displayed. Although FIG. 6 illustrates only three items 106-I-106-K, in various embodiments the queued list 606 includes one or more items 106 queued and ready to be added to the current list 604.

The processing of the virtual turntable system 100 includes the creation of the virtual turntable list 602 of items 106. The turntable list 602 is created and arranged based on certain criteria, such as time, price point, audience preference, and inventory level. In one embodiment, the turntable list 602 is created interactively as the items 106 are being displayed. That is, a producer or operator selects items 106 to add to the turntable list 602 based on the current response and activity of the items 106 already on the list 602. As items 106 rotate off the current list 604 because they become sold out or are determined to be removed from the list 604, the newly selected items 106 are automatically put in rotation with the other displayed items 106. In another embodiment, the turntable list 602 is created automatically by removing items 106 determined to be sold out or otherwise unavailable and replacing those removed items 106 with items 106 from the queued list 606. In still another embodiment, the turntable list 602 is created both interactively and automatically.

When an item 106 on the current list 604 is removed from the list 604, the next item 106-I in the queued list 606 replaces the removed item 106 on the current list 604. The item 106-I is then removed from the queued list 606. In one embodiment, when the queued list 606 reaches a predetermined size, additional items 106 are added to the list 606.

In one embodiment, the turntable list 602 includes the identification of a number of items 106 equal to the number of display containers 204 to be displayed on the monitor 112. In this embodiment, as items 106 become unavailable, new items 106 are retrieved from the data storage 404 and added to the turntable list 602. In another embodiment, the turntable list 602 includes the identification of a number of items 106 greater than the number of items 106-A-106-H to be displayed via the virtual turntable system 100, that is, the turntable list 602 includes the current list 604 plus the queued list 606.

In one embodiment, the data structure of the turntable list 602 includes data corresponding to the items 106. Such data, in various embodiments, includes pointers to fields and records in a table or array. In other embodiments, the data includes specific information and data relating to the items 106.

The virtual turntable system 100 includes various functions. The function of storing a data set related to a plurality of items in a turntable list is implemented, in one embodiment, by the data storage device 404 depicted in FIG. 4. In various embodiments, the data storage device 404 is implemented as a stand-alone device or a device integrated in one or more computers.

The function of accessing the data set representing the turntable list is implemented, in one embodiment, by the video imager 408 depicted in FIG. 4. In various embodiments, the video imager 408 is implemented as a stand-alone device or a device integrated with one or more other functions as depicted in FIG. 4.

The function of creating a video stream from the data set representing the turntable list is implemented, in one embodiment, by the video imager 408 depicted in FIG. 4, and its associated software that performs the functions identified in FIG. 5.

From the foregoing description, it will be recognized by those skilled in the art that a virtual turntable system 100 has been provided. In one embodiment, the system 100 reads the data 532 for the turntable list 602, formats and updates 534 the turntable list 602, and outputs 536 the formatted and updated turntable list 602. The turntable list 602, in various embodiments, includes one or both of the current list 604 and the queued list 606. The system 100, in one embodiment, includes a data storage device 404 for storing data relating to the items 106, a workstation 406 that accesses the data storage device 404, and a video imager 408 with a broadcast video switcher 412 for creating the video streams.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. A method in a computer system for generating broadcast video streams for multiple products, said method comprising the steps of:
    a) retrieving a list of items for display from a computer database, said list of items including a current list of items and a queued list of items, wherein each item represents a product for sale;
    b) updating availability information for each item in said list of items, wherein availability information changes for each item as the item's available quantity changes as the item is being sold;
    c) building a first item container for a first one item in said current list of items, said first one item container containing an item identifier, an item graphic, and an item description related to said first one item in said list of items;
    d) building a second item container for a second one item in said current list of items, said second one item container containing an item identifier, an item graphic, and an item description related to said second one item in said list of items;

e) creating a broadcast video stream for displaying said first item container and said second item container;

f) repeating steps a) through e) for all items in said list of items whereby each item in said current list of items is sequentially added to said broadcast video stream; and g) detecting a change in the current list of items based upon a current item's availability indication and replacing the current item with a queued item from said queued list of items in real-time and inserting into the broadcast video stream.

2. The method of claim 1 further including the step of a1) determining if said list of items has changed, said step a1) being performed after said step a), and if said list of items has changed, performing the steps of a2) retrieving a new list of items and a3) retrieving data on a new item, said retrieving steps being performed in real-time based upon a rate of change of said list of items.

3. The method of claim 1 wherein said first item container includes a price of said one item in said list of items.

4. The method of claim 1, wherein availability information of the queued items is based upon received audience preferences such that the queued list is updated in real-time relative to changes in the received audience preferences as a current item is being replaced.

5. A method in a computer system for generating a broadcast video stream for multiple products, said broadcast video stream providing for displaying sequentially a first previous container for a previous item and a current container for a current item, said method comprising the steps of:

a) building a first item container in said computer for a first item in a set of current items, wherein the first item represents a product for sale, said first item container containing an item identifier, an item graphic, and an item description related to said first item in said set of current of items, a first item availability datum associated with said first item, wherein said first item availability datum changes as the first item's available quantity changes as the item is being sold;

b) building a second item container in said computer for a second item in said set of current items, wherein the second item represents a product for sale, said second item container containing an item identifier, an item graphic, and an item description related to said second item in said set of current of items, a second item availability datum associated with said second item, wherein said second item availability datum changes as the second item's available quantity changes as the item is being sold;

c) detecting a change in said set of current of items based upon a change in the second item availability datum and removing said second item from said second item container and adding an available item from a set of available items to said second item container in real-time;

d) generating and displaying a broadcast video stream including said first item container;

e) after a selected time, generating and displaying a broadcast video stream including said second item container wherein said first item container has been replaced with said second item container; and f) repeat steps b) through e) for each item in said set of current items wherein said second item is an item different than said second item used in a prior iteration of step b).

6. The method of claim 5 further including the steps of (b1) build a third item container for a third item in said set of current items, said third item container containing an item identifier, an item graphic, and an item description related to said third item in said set of current of items, a third item availability datum associated with said third item;

(c1) if said third item availability datum indicates that said third item is to be removed from said set of current items, remove said third item from said set of current items and add an available item from a set of available items to said set of current items; and said step (d) further includes generating said video stream to include said third item container.

7. The method of claim 5 wherein said step a) further includes building said first item container to contain a price element.

8. The method of claim 5 wherein said step a) further includes building said first item container to contain an indicia of availability of said first item.

9. The method of claim 5 wherein said step a) further includes building said first item container to contain an indicia of availability of said first item, and said indicia of availability of said first item includes a color code.

10. The method of claim 5 further including in step (c) before said second item is removed from said set of current items, adding a graphic to said second item container, said graphic indicating a sold out status of said second item.

11. A computer system for a generating broadcast video stream for sequentially displaying multiple products, said system comprising:

a data storage device containing a data set related to a plurality of items in a turntable list, wherein said items represent products for sale;

a broadcast video switcher for creating the broadcast video stream, said broadcast video stream including information for displaying sequentially said plurality of items in said turntable list; and a video imager accessing said data storage device and communicating with said broadcast video switcher, said video imager programmed to execute a process for creating a video stream, wherein said video imager is configured to:

read said turntable list from said data storage device;

format and update said turntable list to build a plurality of turntable containers in real-time relative to the reading step, each one of said plurality of turntable containers corresponding to each one of said plurality of items on said turntable list, each one of said plurality of turntable containers including an item identifier, an item graphic, and an item description related to one of said plurality of items on said turntable list, wherein the update detects a change in the turntable list based upon an item's availability indication changing as the item is being sold; and output the broadcast video stream displaying at least one of said plurality of turntable containers with said at least one of said plurality of turntable containers being replaced by another one of said plurality of turntable containers after a selected time.

12. The computer system of claim 11 wherein said video stream created by said broadcast video switcher includes information for displaying at least two items from said turntable list simultaneously.

13. The computer system of claim 11 further including a workstation in communication with said data storage device, said workstation programmed to execute a process for maintaining said turntable list.

14. The computer system of claim 11 further including a workstation in communication with said data storage device, said workstation programmed to execute a process for maintaining said turntable list, said process including removing an item from said turntable list and adding a replacement item to said turntable list.

15. The computer system of claim 11 wherein said process executed by said video imager includes maintaining said turntable list.

16. The computer system of claim 11 wherein said process executed by said video imager includes maintaining said turntable list by removing an unavailable item from said turntable list and adding an available item to said turntable list.

17. The computer system of claim 11 wherein said step of formatting and updating said turntable list executed by said video imager includes checking for changes to said turntable list.

18. The computer system of claim 11 wherein said step of formatting and updating said turntable list executed by said video imager includes updating an available quantity for each one of said plurality of items in said turntable list.

19. The computer system of claim 11 wherein said step of formatting and updating said turntable list executed by said video imager includes updating a color code corresponding to an availability for each one of said plurality of turntable containers.

20. The computer system of claim 11 wherein said step of formatting and updating said turntable list executed by said video imager includes determining if any one of said plurality of items in said turntable list is unavailable.

21. The computer system of claim 11 wherein said step of formatting and updating said turntable list executed by said video imager includes determining if any one of said plurality of items in said turntable list is unavailable, and, if any one of said plurality of items is unavailable, adding a graphic to said video stream indicating that said one of said plurality of items is unavailable.

22. The computer system of claim 11 wherein said data set includes at least one datum selected from the group consisting of an item identifier, a graphic, a description, an availability, and a price for each one of said plurality of items in said turntable list.

23. The computer system of claim 11 wherein said data set includes an item identifier, a graphic, a description, an availability datum, and a price for each one of said plurality of items in said turntable list.

24. The computer system of claim 11 wherein each one of said plurality of turntable containers includes at least two elements selected from the group consisting of an item identifier, an item graphic, an item description, and an item price for a corresponding one of said plurality of items in said turntable list.

25. A process executed by at least one computer programmed to generate a broadcast video stream for sequentially displaying multiple products, said process comprising the steps of:

reading a turntable list from a data storage device by said at least one computer, said turntable list including identification of a plurality of items, wherein the items represent products for sale;

formatting and updating said turntable list, said at least one computer building a plurality of turntable containers in real-time relative to the reading step, each one of said plurality of turntable containers corresponding to each one of said plurality of items on said turntable list, each one of said plurality of turntable containers including an item identifier, an item graphic, and an item description related to one of said plurality of items on said turntable list, wherein the updating detects a change in the turntable list based upon an item's availability indication changing as the item is being sold; and outputting the broadcasts video stream displaying at least one of said plurality of turntable containers with said at least one of said plurality of turntable containers being replaced by another one of said plurality of turntable containers after a selected time.

26. The process of claim 25 further including the step of maintaining said turntable list.

27. The process of claim 25 further including the step of maintaining said turntable list by removing an unavailable item from said turntable list and adding an available item to said turntable list.

28. The process of claim 25 wherein said step of formatting and updating said turntable list includes checking for changes to said turntable list.

29. The process of claim 25 wherein said step of formatting and updating said turntable list includes updating an available quantity for each one of said plurality of items in said turntable list.

30. The process of claim 25 wherein said step of formatting and updating said turntable list includes updating a color code corresponding to an availability for each one of said plurality of items in said turntable list.

31. The process of claim 25 wherein said step of formatting and updating said turntable list includes determining if any one of said plurality of items in said turntable list is to be removed from said turntable list.

32. The process of claim 25 wherein said step of formatting and updating said turntable list includes determining if any one of said plurality of items in said turntable list is unavailable, and, if any one of said plurality of items is unavailable, adding a graphic to a corresponding one of said plurality of turntable containers indicating that said one of said plurality of items is unavailable.

33. The process of claim 25 wherein said video stream includes at least one element selected from the group consisting of an item identifier, a graphic, a description, and a price for each one of said plurality of items in said turntable list.

34. The process of claim 25 wherein each one of said plurality of turntable containers includes at least two elements selected from the group consisting of an item identifier, an item graphic, an item description, and an item price for a corresponding one of said plurality of items in said turntable list.

35. Computer readable media tangibly embodying a program of instructions executable by a computer to perform a method of generating broadcast video streams for multiple products, said method comprising the steps of:

reading a turntable list from a data storage device, said turntable list including identification of a plurality of items, wherein the items represent products for sale; and formatting and updating said turntable list and building a plurality of turntable containers in real-time relative to the reading step, each one of said plurality of turntable containers corresponding to each one of said plurality of items on said turntable list, each one of said plurality of turntable containers including an item identifier, at least one of an item graphic and an item description, and an item price for a corresponding one of said plurality of items in said turntable list, wherein the updating detects a change in the turntable list based upon an item's availability indication changing as the item is being sold; and outputting the broadcast video stream displaying at least one of said plurality of turntable containers with said at least one of said plurality of turntable containers being replaced by another one of said plurality of turntable containers after a selected time.

36. The computer readable media of claim 35 wherein said step of formatting and updating said turntable list includes performing a process comprising the steps of
   checking for changes to said turntable list;
   updating an available quantity for each one of said plurality of items in said turntable list; and
   determining if any one of said plurality of items in said turntable list is unavailable.

37. The computer readable media of claim 35 wherein said step of formatting and updating said turntable list includes a step of updating a color code associated with each one of said plurality of turntable containers, said color code corresponding to an availability of a corresponding one of said plurality of turntable items.

38. The computer readable media of claim 35 wherein said step of formatting and updating said turntable list includes a step of adding a graphic to a corresponding one of said plurality of turntable containers indicating that said one of said plurality of items is unavailable.

* * * * *